J. V. HARTER.
EVAPORATING PAN.
No. 33,942. Patented Dec. 17, 1861.
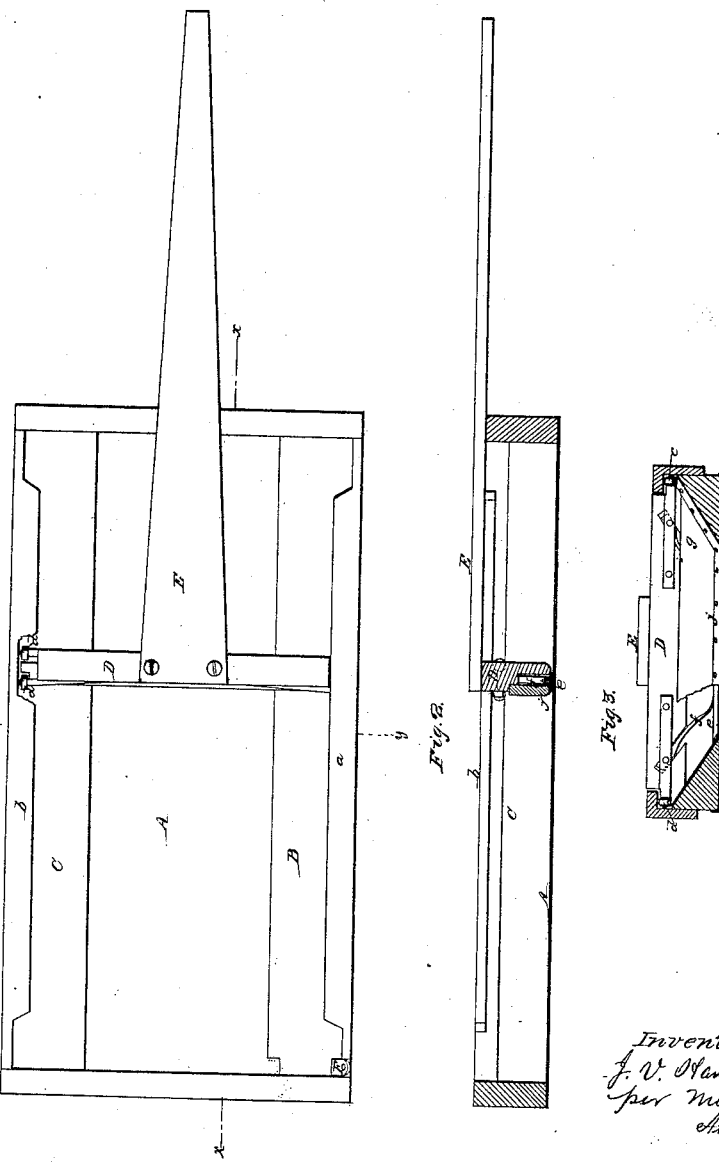

UNITED STATES PATENT OFFICE.

J. V. HARTER, OF PLYMOUTH, ILLINOIS.

IMPROVED EVAPORATING-PAN FOR SACCHARINE JUICES.

Specification forming part of Letters Patent No. 33,942, dated December 17, 1861.

*To all whom it may concern:*

Be it known that I, J. V. HARTER, of Plymouth, in the county of Hancock and State of Illinois, have invented certain new and useful Improvements in Evaporators; and I do hereby declare the following to be a full, clear, and exact description of the same, reference being had to the accompanying drawings, making a part of this specification, in which—

Figure 1 is a plan of my invention. Fig. 2 is a longitudinal section taken at the line $x\,x$, Fig. 1. Fig. 3 is a transverse section of the plan taken at the line $y\,y$, Fig. 1.

Similar letters of reference indicate corresponding parts in the several figures.

This invention consists in an arrangement for preventing the liability of decomposition or carbonization of the sirup from too great heat while being evaporated in an open pan over a naked fire.

To enable others to fully understand and construct my invention, I will proceed to describe it.

A is an oblong shallow pan with outwardly-sloping sides B C, provided on top with inwardly-projecting flanges $a\,b$, cut out at each end of the pan, for the purpose hereinafter to be described.

D is a follower, fashioned on its under side so as to conform to the bottom and sloping sides of the pan, in which it is fitted to move from end to end. The under side of this follower has a slot running transversely through it, in which a slide or shoe, $e$, and two springs, $f\,g$, are fitted, and covered with a strip of goat-skin, or other suitable article, $j$, the springs, when the follower is in the pan, pressing the shoe and skin against the bottom and sloping sides of the pan, and thereby forming a tight joint and preventing liquor passing beneath the follower from one side to the other. On each end, and near the top, the follower is provided with friction-rollers $c\,d$, which, as it is moved from one end of the pan to the other, work against the under surface of the flanges $a\,b$, and serve to relieve the follower from undue friction and to keep its under surface in close contact with the bottom and sides of the pan. E is a handle attached to the follower for the purpose of moving it from end to end of the pan. F is a slide or gate covering an opening in the back end of the pan, through which the sirup is discharged.

The operation is as follows: The pan being set in suitable masonry and the fire built under one end, the smoke and gases pass under the pan lengthwise and escape into the flues of a chimney at the opposite end. The follower being removed, the pan is partly filled with juice, and the evaporation allowed to proceed without interruption until the sirup begins to get nearly thick enough to scorch, when the follower is introduced into the front part of the pan through the places cut out in the flanges, and the sirup moved thereby toward the chimney or cooler portion of the pan and its place supplied with more juice. When the sirup in front of the follower has attained to about 36° of the saccharometer, the gate is raised and the sirup discharged through the opening at the back end of the pan. The slide is now taken out of the back of the pan and introduced in the front end, and the same operation repeated.

The great difficulty heretofore experienced in evaporating in an open pan has been owing to the liability of decomposing or carbonizing the sirup by too great heat. The fire being under the whole surface of the pan, the only way to reduce the heat therefrom was by partly extinguishing the fire.

By the above-described improvement the tendency of the sirup to decomposition and carbonization is avoided by bringing the heat directly in contact only with the thin juices.

What I claim as new herein, and desire to secure by Letters Patent, is—

The follower D, provided with friction-rollers $c\,d$, springs $f\,g$, shoe $e$, and covering $j$, with pan A and flanges $a\,b$, when combined, arranged, and operating in the manner and for the purpose described.

J. V. HARTER.

Witnesses:
WM. H. COLE,
C. MIKESELL.